United States Patent
Fukuba et al.

(10) Patent No.: US 6,871,000 B1
(45) Date of Patent: Mar. 22, 2005

(54) PLASTIC OPTICAL FIBER, OPTICAL FIBER CABLE, PLUGGED OPTICAL FIBER CABLE, AND PRODUCTION METHODS THEREOF

(75) Inventors: Yoshinori Fukuba, Hiroshima (JP); Takashi Akita, Hiroshima (JP); Kikue Irie, Hiroshima (JP); Toshinori Sumi, Hiroshima (JP); Masashi Okamoto, Hiroshima (JP); Jun Okumura, Toyama (JP); Shigeaki Sasaki, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 33 days.

(21) Appl. No.: 10/070,616

(22) PCT Filed: Sep. 7, 2000

(86) PCT No.: PCT/JP00/06093

§ 371 (c)(1),
(2), (4) Date: Jul. 15, 2002

(87) PCT Pub. No.: WO01/20376

PCT Pub. Date: Mar. 22, 2001

(30) Foreign Application Priority Data

Sep. 9, 1999 (JP) .......................................... 11-255802
Mar. 3, 2000 (JP) ...................................... 2000-058812
Mar. 13, 2000 (JP) ...................................... 2000-068866

(51) Int. Cl.$^7$ ................................................ G02B 6/02
(52) U.S. Cl. ..................................... 385/143; 385/126
(58) Field of Search .............................. 385/143, 123, 385/124, 126; 264/1.29, 1.24

(56) References Cited

U.S. PATENT DOCUMENTS 4,687,295 A * 8/1987 Koishi et al. ................ 385/143
4,768,860 A * 9/1988 Tatsukami et al. ........... 385/143
4,798,445 A * 1/1989 Yamamoto et al. .......... 385/143
5,111,526 A * 5/1992 Yamamoto et al. .......... 385/145
5,148,511 A * 9/1992 Savu et al. .................. 385/145
6,132,650 A * 10/2000 Nakamura .................. 264/1.29
6,185,353 B1 * 2/2001 Yamashita et al. ........... 385/124
6,188,824 B1 * 2/2001 Teshima ...................... 385/126

FOREIGN PATENT DOCUMENTS

| JP | 62-131206 A | 6/1987 |
| JP | 63-303304 A | 12/1988 |
| JP | 2-68503 A | 3/1990 |
| JP | 2-116807 A | 5/1990 |
| JP | 5 11128 A | 1/1993 |
| JP | 5-41737 A | 6/1993 |
| JP | 7-77642 A | 3/1995 |
| JP | 2000-147272 | 5/2000 |
| WO | WO99/44083 | 9/1999 |

* cited by examiner

Primary Examiner—Joseph Williams
Assistant Examiner—Dalei Dong
(74) Attorney, Agent, or Firm—Kendrew H. Colton; Fitch, Even, Tabin & Flannery

(57) ABSTRACT

The present invention relates to a production method of a plastic optical fiber which comprises the steps of heat drawing an undrawn plastic optical fiber obtained by melt spinning and annealing the drawn fiber at a circumferential velocity ratio between the front and rear rollers (circumferential velocity of a rear roller/circumferential velocity of a front roller) of 0.5 to 1.2 under heating conditions which satisfy $4 \leq y \leq -1.5x+330$ and $(Tgc-5)°C. \leq x \leq (Tgc+110)° C.$ [Tgc: a glass transition temperature of a core, x: an annealing temperature (° C.), and y: an annealing time (seconds)]. According to the present invention, a plastic optical fiber having a small thermal shrinkage ratio and excellent heat resistance can be provided.

34 Claims, 4 Drawing Sheets

PLASTIC OPTICAL FIBER, OPTICAL FIBER CABLE, PLUGGED OPTICAL FIBER CABLE, AND PRODUCTION METHODS THEREOF

CROSS-REFERENCED APPLICATIONS

This application is the National phase of International Application No. PCT/JP00/06093, filed Sep. 7, 2000, which designated the U.S. and that International Application was not published under PCT Article 21(2) in English.

TECHNICAL FIELD

The present invention relates to a plastic optical fiber, an optical fiber cable and a plugged optical fiber cable which are excellent in heat resistance, and production methods thereof.

BACKGROUND ART

Heretofore, as an optical fiber, an inorganic glass optical fiber capable of excellent optical transmission over a wide wavelength range has been known and practically used mainly in a trunk line system. However, the inorganic glass optical fiber is expensive, has poor workability, and is not so resistant to bending stress. Therefore, a plastic optical fiber which is less expensive and in which making diameter large, the work of end faces and handling are easy has been developed and put to practical use in some fields of lighting, sensors, and wiring for communication between OA or FA equipment.

Generally, a plastic optical fiber (hereinafter referred to as "POF") is a fiber comprising a core-sheath structure in which as a core, a polymer having a large refractive index and excellent light transmittance such as polymethyl methacrylate, polycarbonate, polystyrene or amorphous polyolefin and a transparent polymer having a smaller refractive index than that of the core polymer as a sheath are used.

As a industrial production process of such a POF, in general, a core polymer and a sheath polymer are arranged concentrically by use of a multi-component fiber spinning nozzle and melt-spun into a fiber, and the fiber is then drawn under heating for improving mechanical strength.

Of cores to be used in the POF, polymethyl methacrylate is used as a core of a high-performance POF on an industrial scale since it is excellent in transparency, mechanical strength and weather resistance.

However, since the glass transition temperature (hereinafter referred to as "Tg") of polymethyl methacrylate is as high as 100 to 115° C., its application is limited in view of heat resistance.

For this reason, Japanese Patent Application Laid-Open No. 18608-1983, for example, proposes that a protective layer is further provided around a sheath layer to form a structure comprising three or more layers so as to improve heat resistance.

Further, Japanese Patent Application Laid-Open No. 11128-1993 discloses a technique which improves uniformity in the diameter of a POF by suppressing fluctuations in the diameter of the POF when it is subjected to heat drawing or an annealing after the heat drawing.

Further, Japanese Patent Application Laid-Open No. 16905-1992 discloses a method of improving a transmission loss by heating a POF having a polycarbonate as a core at 60 to 100° C. for a long time.

However, the method disclosed in Japanese Patent Application Laid-Open No. 16905-1992 cannot improve the heat resistance of a POF since the annealing temperature is lower than the Tg of the core by 50° C. or more and the annealing time is short. Further, the invention disclosed in Japanese Patent Application Laid-Open No. 18608-1983 has the problem that even if the heat resistance of a material used in the protective layer is improved, a core itself is thermally shrunk when the temperature used gets close to the Tg of the core. Further, Japanese Patent Application Laid-Open No. 11128-1993 is about the internal structure of a heating furnace used for the annealing, and since an appropriate annealing time and tension when a POF is heated at a predetermined annealing temperature are not set, the effect of reducing the thermal shrinkage of a POF is not satisfactory.

In addition, to improve the properties such as heat resistance of a POF, Japanese Patent Application Laid-Open Nos. 131206-1987, 303304-1988, 68503-1990, 201270-1994, 299912-1987 and the like disclose a method in which a POF is subjected to a non-contact annealing in line after the drawing step to maintain orientation of polymer chains in the POF axial direction which has been provided in the drawing step as much as possible so as to suppress the shrinkage of the POF at high temperatures.

However, since this method cannot remove inner strain of a POF sufficiently, it cannot improve the heat resistance of the POF to a satisfactory level. Further, when the temperature of a non-contact heating furnace is raised to remove the inner strain, the orientation of polymer chains cannot be maintained, thereby causing decrease in the mechanical strength of the POF and an increase in the non-uniformity of the diameter of the POF.

When these conventional POFs are used in optical communication or a sensor in a high temperature environment, e.g., in an engine room of an automobile or the like or in the interior of an automobile in mid summer, they are thermally shrunk, thereby causing decrease in optical transmission properties or trouble in wiring in a connector or the like.

DISCLOSURE OF THE INVENTION

An object of the present invention is to provide a plastic optical fiber, an optical fiber cable and a plugged optical fiber cable which are excellent in heat resistance, and production methods thereof.

The above object can be achieved by the following present invention.

The present invention relates to a plastic optical fiber having a shrinkage stress occurring temperature obtained by thermomechanical analysis of not lower than [(a glass transition temperature of a core)−35]° C.

Further, the present invention relates to a plastic optical fiber cable obtained by forming a coating layer around the plastic optical fiber of the present invention.

Further, the present invention relates to a plugged plastic optical fiber cable obtained by attaching a plug on the tip of the plastic optical fiber cable of the present invention.

Further, the present invention relates to a method for producing a plastic optical fiber which comprises the steps of heat drawing an undrawn plastic optical fiber obtained by melt spinning and subjecting the drawn fiber to an annealing at a circumferential velocity ratio between the front and rear rollers (circumferential velocity of a rear roller/circumferential velocity of a front roller) of 0.5 to 1.2 under heating conditions which satisfy $4 \leq y \leq -1.5x+330$ and $(Tgc-5)° C. \leq x \leq (Tgc+110)° C.$ [Tgc: a glass transition temperature of a core, x: an annealing temperature (° C.), and y: an annealing time (seconds)].

Further, the present invention relates to a method for producing a plastic optical fiber which comprises the step of conducting the annealing twice or more under the above heating conditions in the above production method of the present invention.

Further, the present invention relates to a method for producing a plastic optical fiber which comprises the step of heat treating a plastic optical fiber obtained by melt spinning at a temperature from (a glass transition temperature of a core−5)° C. to (a glass transition temperature of the core+80)° C. while a tension of $0.35 \times 10^6$ to $1.5 \times 10^6$ Pa is applied to the plastic optical fiber.

Further, the present invention relates to a method for producing a plastic optical fiber cable which comprises the steps of obtaining a plastic optical fiber by the above method of the present invention and forming a coating layer around the obtained optical fiber.

Furthermore, the present invention relates to a method for producing a plugged plastic optical fiber cable which comprises the steps of obtaining a plastic optical fiber by the above method of the present invention and attaching a plug on the tip of the obtained optical fiber cable.

According to the present invention, a plastic optical fiber, an optical fiber cable and a plugged optical fiber cable which have a small shrinkage ratio and excellent heat resistance can be provided.

BEST MODE FOR CARRYING OUT THE INVENTION

Figure 1:
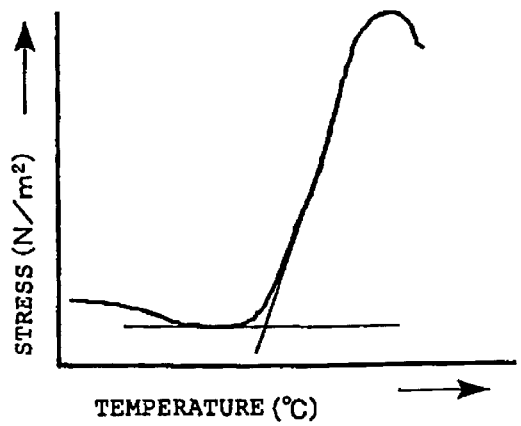
FIG. 1 is a diagram for illustrating a method of determining a shrinkage stress occurring temperature of a plastic optical fiber and a graph indicating changes in stress against temperature and obtained by thermomechanical analysis.

Preferred embodiments of the present invention will be described hereinafter. A glass transition temperature of a core constituting a POF will be indicated as "Tgc" as appropriate.

In the present invention, a POF having excellent heat resistance can be obtained by setting the shrinkage stress occurring temperature of the POF to be (Tgc−35)° C. or higher (first invention).

Further, in the present invention, the heat resistance of the POF of the first invention can be further improved by, in particular, using a homopolymer of methyl methacrylate as the core of the POF and setting the absolute value of the birefringence of the core at $2.0 \times 10^{-4}$ or smaller.

Further, in the present invention, the heat resistance of the POF of the first invention can be further improved and a decrease in the mechanical strength of the POF can be reduced by using a homopolymer of methyl methacrylate as the core of the POF, setting the shrinkage stress occurring temperature obtained by thermomechanical analysis of the POF to be (the glass transition temperature of the core<20)° C. or higher and setting the absolute value of the birefringence of the core to be $1.5 \times 10^{-4}$ or larger.

Further, in the present invention, a POF having excellent heat resistance can be obtained because an undrawn POF obtained by melt spinning is heat-drawn and then subjected to an annealing at a circumferential velocity ratio between the front and rear rollers (circumferential velocity of a rear roller/circumferential velocity of a front roller) of 0.5 to 1.2 under heating conditions which satisfy $4 \leq y \leq -1.5x+330$ and $(Tgc-5)° C. \leq x \leq (Tgc+110)° C.$ [Tgc: a glass transition temperature of a core, x: an annealing temperature (° C.), and y: an annealing time (seconds)](second invention).

Further, in the present invention, in the production method of a POF of the second invention, a POF having better heat resistance and mechanical strength can be obtained by using a homopolymer of methyl methacrylate as the core, carrying out the above heat drawing such that the absolute value of the birefringence of the core would become $3 \times 10^{-4}$ or larger and carrying out the above annealing at a circumferential velocity ratio between the front and rear rollers (circumferential velocity of the rear roller/circumferential velocity of the front roller) of 1 or less under conditions which satisfy $x \leq (Tgc+20)° C.$ [Tgc: the glass transition temperature of the core, x: an annealing temperature (° C.)].

Further, in the present invention, a POF having further improved heat resistance can be obtained by carrying out the above annealing twice or more under the above heating conditions (third invention).

Further, in the present invention, a POF having improved heat resistance can be obtained by heat treating a POF obtained by melt spinning at temperatures from (Tgc−5)° C. to (Tgc+80)° C., preferably after the POF is heat-drawn, while applying a tension of $0.35 \times 10^6$ Pa to $1.5 \times 10^6$ Pa to the POF (fourth invention).

As the core of the POF of the present invention, a transparent amorphous polymer is suitable. Particularly, a homopolymer of methyl methacrylate or a copolymer comprising a methyl methacrylate unit and another monomer unit (hereinafter referred to as "MMA polymer" as required) is preferably used. As other materials usable as the core of the POF, a copolymer comprising a unit of monomer such as a methacrylic acid ester as exemplified by cyclohexyl methacrylate, t-butyl methacrylate, isobornyl methacrylate, adamantly methacrylate, benzyl methacrylate, phenyl methacrylate or naphthyl methacrylate and a unit of monomer copolymerizable with these monomers, a polycarbonate, a polystyrene, a styrene-methacrylate copolymer, or deuterides of these polymers which are obtained by substituting all or some of hydrogen atoms of the above polymers with deuterium atoms can be used. As a matter of course, other transparent polymers and transparent blends can also be used.

An MMA polymer, particularly a homopolymer of methyl methacrylate, has a wider temperature range in which it can remain in a rubber state than other transparent amorphous materials, particularly a polycarbonate. Since it never happens that the MMA polymer becomes stiff and can hardly be drawn at temperatures lower than a certain temperature or that it becomes suddenly too stretchable at temperatures higher than a certain temperature, the MMA polymer can be drawn or annealed in good condition. Further, since its orientation is not loosened as easily as that of a polycarbonate in particular, its tension is not lowered by heat easily. Therefore, even when the annealing is carried out with low tension, the annealing can be carried out stably and non-uniformity in the diameter of a fiber is not worsened easily. Further, since the orientation is not loosened easily, it is not necessary to adjust an annealing temperature to an excessively low temperature so as not to loosen the orientation, so that the MMA polymer can be heat treated in a moderately viscoelastic state. As a result, a desired annealing effect can be obtained to a sufficient degree without degrading other properties of a POF such as non-uniformity in the diameter of the fiber. Particularly, when the annealing is carried out with low tension as in the fourth invention, a POF using an MMA polymer as a core is suitable.

As a copolymer comprising a methyl methacrylate unit and another monomer unit, a copolymer comprising at least 70% by weight of methyl methacrylate unit and at most 30% by weight of the other monomer unit based on 100% by weight of all monomer units is preferred. Illustrative examples of monomers copolymerizable with methyl methacrylate include methacrylic acid esters such as cyclohexyl methacrylate, isobornyl methacrylate, benzyl methacrylate, phenyl methacrylate and 2,2,2-trifluoroethyl methacrylate, acrylic esters such as methyl acrylate and ethyl acrylate, and maleimide compounds intended for improving heat resistance such as N-cyclohexylmaleimide and N-isopropylmaleimide.

A method for producing the core is not particularly limited, and a known polymerization method is used. However, to prevent foreign substrates from mixing into the core, a continuous bulk polymerization method or a continuous solution polymerization method is preferably used.

Illustrative examples of materials suitably used in the sheath of the POF of the present invention from the viewpoint of transmission characteristics include a homopolymer of a fluorine-based methacrylate, a copolymer comprising a fluorine-based methacrylate unit and a methacrylic ester monomer unit, a copolymer containing a vinylidene fluoride unit as a main component such as a vinylidene fluoride-tetrafluoroethylene copolymer, an α-fluoromethacrylate, and mixtures thereof.

As the structure of the POF of the present invention, a known structure can be used. Illustrative examples of a POF having such a known structure include a POF having a two-layer structure comprising a core and a sheath, a graded index-type POF whose core has refractive index distribution, a multi-core POF having a sea-island structure in which a plurality of island components each comprising a core and a sheath are disposed in a sea component, a multi-core POF having a structure in which a plurality of cores are collected in a sheath, and a multilayer POF whose core or sheath has a multilayer structure and whose refractive index gradually changes from the center toward the periphery.

A protective layer having such properties as solvent resistance and heat resistance may be formed on the peripheries of these POFs. As a material (protective material) used in the protective layer, a material having excellent mechanical strength is preferably used, and a vinylidene fluoride-tetrafluoroethylene copolymer is particularly preferably used. The vinylidene fluoride-tetrafluoroethylene copolymer has high adhesion to a polymer used as a sheath and comprising a fluorine-based methacrylate unit or a vinylidene fluoride unit or Nylon 12 which is suitably used in a coating layer in such an application that requires heat resistance in particular. Therefore, together with the characteristic of the POF of the present invention that it has small shrinkage in a high-temperature environment, a POF cable obtained by forming a protective layer comprising a vinylidene fluoride-tetrafluoroethylene copolymer around the POF of the present invention having a core-sheath structure in which the sheath comprises a polymer comprising a fluorine-based methacrylate unit or a vinylidene fluoride unit and by forming a coating layer comprising Nylon 12 on the protective layer can significantly reduce the pistoning phenomenon in a high-temperature environment of the POF cable.

A POF melt-spun by use of a material as described above is preferably heat-drawn for the purpose of improving its mechanical strength. As a drawing device, one having a heating furnace disposed between a front roller and a rear roller can be used, for example. Although an appropriate heating temperature (drawing temperature) at the time of drawing is set according to the physical properties of a core, the temperature is preferably $(Tgc+5)°$ C. to $(Tgc+65)°$ C., more preferably $(Tgc+10)°$ C. to $(Tgc+60)°$ C. When the drawing temperature is out of the above temperature range, that is, lower than $(Tgc+5)°$ C., the POF may become difficult to stretch. On the other hand, when the drawing temperature is higher than $(Tgc+65)°$ C., sufficient mechanical strength may not be imparted to the POF by drawing. When the core is a PMMA, the drawing temperature is preferably 115° C. or higher, more preferably 120° C. or higher, much more preferably 125° C. or higher, also is preferably 185° C. or lower, more preferably 180° C. or lower, much more preferably 175° C. or lower.

The drawing ratio in the heat drawing is preferably 1.1 to 3.5 times (the circumferential velocity ratio between the front and rear rollers (circumferential velocity of the rear roller/circumferential velocity of the front roller) is 1.1 to 3.5), more preferably 1.5 to 3.3 times, much more preferably 1.5 to 3.0 times. When the drawing ratio is out of the above range, that is, smaller than 1.1 times, sufficient mechanical strength may not be imparted to the POF by drawing. On the other hand, when the drawing ratio is larger than 3.5 times, it may become difficult to carry out uniform drawing.

Thus, in the production of the POF, drawing is generally carried out for improving the mechanical strength of the POF. However, while the molecules of the POF are oriented by drawing the POF, stress (inner strain) different from orientation remains and is fixed in the POF. Therefore, as the temperature of the POF is increased to a temperature close to the Tgc of the POF, the fixed residual stress (inner strain) is released, thereby causing the POF to shrink significantly.

The degree of such stress (inner strain) remaining in a POF can be known by means of thermomechanical analysis. That is, when a POF is subjected to thermomechanical analysis as the temperature of the POF is increased at a fixed speed, fixed residual stress is released at a given temperature, thereby causing shrinkage stress. A POF having less residual stress has a shrinkage stress occurring temperature shifted to a higher temperature side. Thus, a POF having a high shrinkage stress occurring temperature is a POF having a small thermal shrinkage ratio and excellent heat resistance.

In the present invention, a POF is heat-treated under given conditions to remove residual stress from the POF, thereby reducing the thermal shrinkage of the POF and improving the heat resistance of the POF.

The POF of the present invention has a shrinkage stress occurring temperature obtained by thermomechanical analysis (TMA) of not lower than (Tgc−35)° C. (first invention). Such a POF has a low thermal shrinkage ratio and exhibits excellent heat resistance accordingly. The higher the shrinkage stress occurring temperature the better it is. However, it is generally lower than or equal to the Tgc. When a POF is applied to such an application as interior wiring of an automobile, it is required to be heat resistant at least at 90° C. A POF which has excellent heat resistance, that is, exhibits a thermal shrinkage ratio of not higher than 2% in a heat resistance test conducted at 90° C. for 65 hours can be obtained by setting the shrinkage stress occurring temperature of the POF to be not lower than (Tgc−35)° C. as in the present invention.

The shrinkage stress occurring temperature can be determined from the shrinkage stress curve shown in FIG. 1 as described later. Further, since the result of the thermomechanical analysis is apt to slightly change according to measurement conditions, the thermomechanical analysis is carried out at a temperature rising rate of 5° C./min under a constant load of $2.2 \times 10^5$ Pa in the present invention.

A thermal shrinkage ratio which is an indicator of the heat resistance of the POF of the present invention is a thermal shrinkage ratio in the longitudinal direction of the POF. A POF having a smaller thermal shrinkage ratio has better heat resistance. The measurement of the thermal shrinkage ratio is carried out in the following manner. A POF is marked at an interval ($L_0$) of 50 cm in advance, and the POF is hung in a hot air dryer set at 90° C. without contacting walls, shelves and the like in the hot air dryer. After 65 hours, the POF was taken out of the dryer and left standing to cool to room temperature (20° C.). Then, an interval ($L_1$) between the marks is measured, and a thermal shrinkage ratio is calculated from the $L_0$ and $L_1$ by use of the following equation.

Thermal shrinkage Ratio (%)=[($L_0-L_1$)/$L_0$]×100

Further, in the present invention, a POF having a reduced thermal shrinkage ratio and exhibiting excellent heat resistance accordingly can be obtained by using a homopolymer of methyl methacrylate as a core of the POF and setting the birefringence absolute value of the core to be not larger than $2.0 \times 10^{-4}$.

As described above, heat drawing is carried out for imparting mechanical strength to a POF. An example of an indicator for molecular orientation of a core which is caused by stretch of a POF is birefringence of the core. The value of the birefringence may be positive or negative depending on a material used as a core. The larger the absolute value of the birefringence, the higher the degree of molecular orientation and the mechanical strength of a POF. However, as the absolute value of the birefringence becomes larger, residual stress (inner strain) fixed in a POF which degrades the heat resistance of the POF also increases. In the present invention, the birefringence of a core of a POF may be adjusted so as to relax the residual inner strain in the POF and improve the heat resistance of the POF. In the case of a POF having a core comprising a homopolymer of methyl methacrylate, when the absolute value of birefringence becomes $2.0 \times 10^{-4}$ or smaller, its thermal shrinkage ratio becomes small and heat resistance improves. Therefore, when prime importance is placed on the heat resistance of the POF of the present invention which has a core comprising a homopolymer of methyl methacrylate, the birefringence absolute value of the core is preferably not larger than $2.0 \times 10^{-4}$, more preferably $0.5 \times 10^{-4}$ to $2.0 \times 10^{-4}$. When the birefringence absolute value of the core becomes smaller than $0.5 \times 10^{-4}$ its mechanical strength may be degraded.

A POF which has a core comprising a homopolymer of methyl methacrylate and having a birefringence absolute value of not larger than $2.0 \times 10^{-4}$, though depending on the physical properties of the used homopolymer of methyl methacrylate, can be obtained by subjecting the POF to the annealing to be described later. The birefringence is measured in the manner to be described later.

As described above, the mechanical strength of a POF can be improved by drawing the POF to impart molecular orientation so as to increase the absolute value of the birefringence of a core. However, at the same time, the degree of its thermal shrinkage also becomes greater. In the present invention, the birefringence of a core and the thermal shrinkage stress occurring temperature of a POF can be set to be within predetermined ranges so that thermal shrinkage and a decrease in mechanical strength can be reduced. For example, in the case of a POF having a core comprising a homopolymer of methyl methacrylate, the POF preferably has a birefringence absolute value of not lower than $1.5 \times 10^{-4}$ and a shrinkage stress occurring temperature obtained by thermomechanical analysis of not lower than (Tgc−20)° C. since sufficient mechanical strength and anti thermal shrinkability can be imparted to the POF. More preferably, the absolute value of the birefringence is not lower than $2.3 \times 10^{-4}$ and the shrinkage stress occurring temperature is not lower than (Tgc−15)° C. When the absolute value of the birefringence is too high, it is difficult to have a shrinkage stress occurring temperature obtained by thermomechanical analysis of not lower than (Tgc−20)° C. Therefore, the absolute value of the birefringence is preferably not higher than $5 \times 10^{-4}$. Such a POF can exhibit a thermal shrinkage ratio of not higher than 0.5% in a heat resistance test conducted at 90° C. for 65 hours, and the number of repeated bending counted for a POF cable which is obtained by forming a coating layer composed of a polyethylene around the POF and has an outside diameter (thickness of the coating layer: 0.6 mm) of 2.2 mm can be at least 10,000 times. Further, the number of repeated bending counted for a POF cable which is obtained by forming a coating layer composed of Nylon 12 around the POF and has an outside diameter (thickness of the coating layer: 0.6 mm) of 2.2 mm can be at least 20,000 times. The coating layer composed of Nylon 12 can be coated twice or more as required. The number of repeated bending is counted by a method to be described later. A POF with a larger number of repeated bending has better mechanical strength.

In the production method (second invention) of a POF of the present invention, a drawn POF is heat-treated at a circumferential velocity ratio between the front and rear rollers (circumferential velocity of a rear roller/circumferential velocity of a front roller) of 0.5 to 1.2 under heating conditions which satisfy $4 \leq y \leq -1.5x+330$ and (Tgc−5)° C. $\leq x \leq$ (Tgc+110)° C. Thereby, internal stress (inner strain) fixed and remaining in the POF is partially relaxed, and a POF having a smaller thermal shrinkage ratio and better heat resistance than a POF not subjected to such an annealing can be obtained. By the production method of the present invention, a POF having a shrinkage stress occurring temperature obtained by thermomechanical analysis of not lower than (Tgc−35)° C. can be obtained, and a POF which exhibits a thermal shrinkage ratio of not higher than 2% in a heat resistance test conducted at 90° C. for 65 hours. Further, when a homopolymer of methyl methacrylate is used as a core, a POF which has a core having a birefringence absolute value of not higher than $2.0\times10^{-4}$ and has excellent heat resistance can be obtained. Further, when a homopolymer of methyl methacrylate is used as a core, a POF which has a core having a birefringence absolute value of not lower than $1.5\times10^{-4}$ and has a shrinkage stress occurring temperature obtained by thermomechanical analysis of not lower than (Tgc−20)° C., that is, a POF having excellent heat resistance and mechanical strength can be obtained. In this case, the absolute value of the birefringence of the core is preferably not lower than $2.3\times10^{-4}$, and the shrinkage stress occurring temperature obtained by thermomechanical analysis is preferably not lower than (Tgc−15)° C.

When the circumferential velocity ratio (circumferential velocity of the rear roller/circumferential velocity of the front roller) is smaller than 1, the obtained POF is shrunk. In view of the possibility that too large shrinkage may cause a decrease in molecular orientation imparted by drawing and in turn a degradation in the mechanical strength of the POF, the possibility that productivity may be decreased since it takes long time to have large shrinkage, and the possibility that the mechanical strength of the POF may be further degraded since the POF is heated at high temperatures not lower than (Tgc−5)° C. during the long time period, a circumferential velocity ratio of not smaller than 0.5 is used. On the other hand, when the circumferential velocity ratio exceeds 1.2, an effect of improving heat resistance according to the present invention is not exhibited to a sufficient degree.

Further, in the present invention, the annealing is carried out under heating conditions which satisfy $4 \leq y \leq -1.5x+330$ and $(Tgc-5)° C. \leq x \leq (Tgc+110)° C.$ When an annealing temperature x is out of the above temperature range, an effect of improving heat resistance by the annealing becomes less sufficient as the annealing temperature becomes lower than (Tgc−5)° C., while the annealing temperature is larger than (Tgc+110)° C., mechanical strength imparted by drawing may be degraded. The annealing temperature x is preferably (Tgc+90)° C. or lower, more preferably (Tgc+75) or lower. Also, the annealing temperature x is preferably Tgc ° C. or higher, more preferably (Tgc+15)° C. or higher.

When a core is polymethylmethacrylate, the annealing temperature x is preferably 110° C. or higher, more preferably 115° C. or higher. Also, the annealing temperature x is preferably 200° C. or lower, more preferably 190° C. or lower. Meanwhile, when the annealing time y is less than 4 seconds, an effect of improving heat resistance by the annealing becomes insufficient, while when the annealing time y is more than (~1.5x+330) seconds, mechanical strength imparted by drawing is degraded. In the present invention, the annealing time is calculated from the following equation:

The annealing time $(min)=2s/(v_1+v_2)$

In the above equation, s indicates a furnace length (m) of a heating furnace, $v_1$ a circumferential velocity (m/min) of a front roller, and $v_2$ a circumferential velocity (m/min) of a rear roller.

As a heating furnace used in conducting the annealing, a non-contact heating furnace is preferably used for protecting a POF from being damaged. A heating furnace using hot air as a heating medium or a moist heating furnace using pressurized steam as a heating medium can be used.

Further, in the production method (second invention) of the present invention, a homopolymer of methyl methacrylate is preferably used as a core, a POF is preferably heat-drawn such that the absolute value of the birefringence of the core would be not smaller than $3\times10^{-4}$, and the subsequent annealing is preferably carried out at a circumferential velocity ratio between the front and rear rollers (circumferential velocity of a rear roller/circumferential velocity of a front roller) of not larger than 1 and an annealing temperature of not higher than (Tgc+20)° C. The heat drawing is preferably carried out such that the absolute value of the birefringence of the core would be not larger than $6\times10^{-4}$ in view of a load to be imposed on the subsequent annealing. When the core of the heat-drawn POF has a birefringence absolute value of not smaller than $3\times10^{-4}$, molecular orientation caused by heat drawing can be imparted to a sufficient degree. When the circumferential velocity ratio between the front and rear rollers at the time of the annealing conducted after the heat drawing is not larger than 1, a shrinkage stress occurring temperature can be increased and thermal shrinkage can be reduced. When the annealing temperature is set to be relatively low, i.e., not higher than (Tgc+20)° C., a decrease in molecular orientation caused by the annealing can be minimized. That is, by carrying out heat drawing and the annealing under such conditions, sufficient mechanical strength and anti thermal shrinkability can be imparted to a POF, whereby a POF which has a shrinkage stress occurring temperature obtained by thermomechanical analysis of not lower than (Tgc−20)° C. and has a core having a birefringence absolute value of not lower than $1.5\times10^{-4}$ can be obtained. Further, by producing the POF under the above conditions, the thermal shrinkage ratio of the POF can be 0.5% or smaller, the number of repeated bending counted when a coating layer composed of a polyethylene is formed around the POF can be at least 10,000 times, and the number of repeated bending counted when a coating layer composed of Nylon 12 is formed around the POF can be at least 20,000 times as described above. A plurality of coating layers can be coated as required.

In the present invention, a POF is preferably heat-treated while a tension of $0.35\times10^6$ to $1.5\times10^6$ Pa, preferably $0.35\times10^6$ to $1.35\times10^6$ Pa is applied to the POF. When the tension is smaller than $0.35\times10^6$ Pa, the POF makes contact with an annealing device at the time of the annealing, so that the annealing may not be able to be carried out stably. On the other hand, when it is larger than $1.5\times10^6$ Pa, an effect of improving heat resistance by the annealing may be insufficient. The tension at the time of the annealing can be adjusted by setting an annealing temperature, a flow rate of a heating medium used in the annealing and a circumferential velocity ratio between the front and rear rollers (circumferential velocity of a rear roller/circumferential velocity of a front roller) of a heating furnace at the time of the annealing to be proper values.

Further, in the production method (second invention) of the present invention, when the annealing is carried out while tension is applied to a POF as described above, the tension is preferably not larger than $1.35\times10^6$ Pa, an annealing temperature is preferably (Tgc−5)° C. to (Tgc+15)° C., and the annealing time preferably satisfies $10 \leq y \leq -1.5x+330$ [x: an annealing temperature (° C.), and y: an annealing time (seconds)]. By carrying out the annealing under such conditions, a POF having a birefringence absolute value of not lower than $2.3\times10^{-4}$ and a shrinkage stress occurring temperature of not lower than (Tgc−15)° C. can be obtained.

In the above production method, a drawing step and an annealing step may be carried out in a continuous process. Alternatively, a drawn POF may be wound around a bobbin, and then the POF may be heat-treated.

Further, in the production method of a POF according to the present invention, heat resistance can be improved by carrying out the annealing twice or more under the above heating conditions of the above production method (second invention) (third invention). Thereby, inner strain (internal stress) fixed and remaining in a POF is partially relaxed, and a POF having a smaller thermal shrinkage ratio and better heat resistance than a POF not subjected to such an annealing or a POF subjected to the annealing only once can be obtained. In this case, an annealing temperature x is preferably not lower than Tgc ° C. When a POF having a shrinkage stress occurring temperature of not lower than (Tgc−35)° C. is produced by the method (third invention) of the present invention, a thermal shrinkage ratio of not higher than 2%, or even not higher than 1.5%, can be achieved in a heat resistance test conducted at 90° C. for 65 hours. Further, when a homopolymer of methyl methacrylate is used as a core, a POF with a core having a birefringence absolute value of not larger than $2.0 \times 10^{-4}$ can be obtained.

The annealing which satisfies the above heating conditions is preferably carried out twice to six times. When the annealing is carried out at least twice, heating can be done to a sufficient degree without increasing a heating furnace length. Further, when the annealing is carried out six times at the maximum, the constitution of the device becomes relatively simple. This annealing may be repeated under the same conditions or different conditions. A heating furnace used in the annealing and heating conditions at the time of the annealing are the same as those of the above production method (second invention) and are set as appropriate according to the number of times the annealing is carried out.

In the production method of the present invention, a drawing step and the annealing may be carried out in a continuous process. Alternatively, after the drawing step and a first annealing are carried out in a continuous process, the subsequent annealing may be carried out after a drawn POF may be wound around a bobbin. Alternatively, a drawn POF may be wound around a bobbin, and then the POF may be subjected to the annealing. Alternatively, a method in which a drawn POF is caused to move back and force in an annealing device can also be used.

In the present invention (fourth invention), a POF obtained by melt spinning is heat-treated at temperatures ranging from (Tgc−5)° C. to (Tgc+80)° C. while a tension of $0.35 \times 10^6$ to $1.5 \times 10^6$ Pa, preferably $0.35 \times 10^I$ to $1.35 \times 10^6$ Pa, is applied to the POF, thereby removing inner strain fixed in the POF and obtaining a POF having excellent heat resistance. According to this method, the POF of the first invention, that is, a POF having a shrinkage stress occurring temperature obtained by thermomechanical analysis of not lower than (Tgc−35)° C. can be obtained. Further, a POF which exhibits a thermal shrinkage ratio of not higher than 2% in a heat resistance test conducted at 90° C. for 65 hours can be obtained. Further, when a homopolymer of methyl methacrylate is used as a core, a POF with a core having a birefringence absolute value of not larger than $2.0 \times 10^{-4}$ can be obtained. Further, when a homopolymer of methyl methacrylate is used as a core, a POF which has a core having a birefringence absolute value of not smaller than $1.5 \times 10^{-4}$ and has a shrinkage stress occurring temperature obtained by thermomechanical analysis of not lower than (Tgc−20)° C. can be obtained.

The above annealing is preferably carried out after an undrawn POF obtained by melt spinning is subjected to heat drawing.

In the above annealing, when the tension is smaller than $0.35 \times 10^6$ Pa, the POF may make contact with an annealing device at the time of the annealing, so that the annealing may become unstable, while when it is larger than $1.5 \times 10^6$ Pa, an effect of improving heat resistance by the annealing is insufficient. The tension at the time of the annealing can be adjusted by setting an annealing temperature, a flow rate of a heating medium used in the annealing and a circumferential velocity ratio between the front and rear rollers (circumferential velocity of a rear roller/circumferential velocity of a front roller) of a heating furnace at the time of the annealing to be proper values.

The annealing temperature is (Tgc−5)° C. to (Tgc+80)° C., preferably (Tgc−5)° C. to (Tgc+60)° C., more preferably (Tgc−5)° C. to (Tgc+30)° C., particularly preferably Tgc° C. to (Tgc+15)° C. When the annealing temperature is out of the above range, that is, lower than (Tgc−5)° C., an improving effect caused by the annealing is insufficient. On the other hand, when the annealing temperature is higher than (Tgc+80)° C., mechanical properties may be degraded due to relax of orientation imparted by drawing.

To improve heat resistance significantly without degrading mechanical strength in the annealing, it is preferable to use a polymer containing a methyl methacrylate unit in an amount of at least 70% by weight as a core of a POF. Particularly, when a POF with a core comprising a homopolymer of methyl methacrylate is heat-treated at temperatures ranging from (Tgc−5)° C. to (Tgc+30)° C., preferably temperatures not higher than (Tgc+15)° C. while a tension of $0.35 \times 10^6$ to $1.5 \times 10^6$ Pa, preferably a tension of not larger than $1.35 \times 10^6$ Pa is applied to the POF, a POF which has a core having a birefringence absolute value of not lower than $1.5 \times 10^{-4}$ preferably not lower than $2.3 \times 10^{-4}$ and has a shrinkage stress occurring temperature obtained by thermomechanical analysis of not lower than (Tgc−20)° C., preferably not lower than (Tgc−15)° C., that is, a POF having mechanical strength and heat resistance can be obtained. Further, by producing the POF under the above conditions, the thermal shrinkage ratio of the POF can be 0.5% or smaller, the number of repeated bending counted when a coating layer composed of a polyethylene is formed around the POF can be at least 10,000 times, and the number of repeated bending counted when a coating layer composed of Nylon 12 is formed around the POF can be at least 20,000 times as described above. A plurality of coating layers can be coated as required.

For the annealing of a POF, a known method such as a hot air method, a moist heating method or a hot water method can be used. When hot air is used in the annealing, the higher the velocity of the hot air the more preferable it is, from the viewpoint of heating efficiency. However, the velocity of the hot air is generally set to be 2 to 10 m/s. When the velocity of the hot air is lower than 2 m/s, heating efficiency becomes insufficient, whereby the heat resistance of the POF may not be able to be improved to a sufficient degree. On the other hand, when the velocity of the hot air is higher than 10 m/s, the POF sways in a heating furnace, whereby the quality of the POF may be degraded. In this case, the sway of the POF can be prevented effectively by coinciding the heading direction of the hot air with the heading direction of the POF.

Tension applied to a POF at the time of the annealing varies according to the temperature of the POF at the time of the annealing. The temperature of the POF is determined by an annealing temperature, a flow rate of a heating medium and the like. When the temperature of the POF at the time of the annealing is increased, tension tends to increase since the POF is shrunk. However, when the temperature is too high, orientation is further relaxed, thereby causing the tension to lower.

This annealing may be a fixed-length treatment (circumferential velocity ratio of rollers is about 1) or an alleviation treatment (circumferential velocity ratio of rollers is less than 1). However, to carry out the annealing under a tension of $0.35 \times 10^6$ to $1.5 \times 10^6$ Pa, the annealing is preferably the alleviation treatment. The alleviation treatment is preferably carried out at a circumferential velocity ratio between the front and rear rollers (circumferential velocity of a rear roller/circumferential velocity of a front roller) of 0.5 to 0.98, more preferably 0.7 to 0.95, particularly preferably 0.8 to 0.95. When the circumferential velocity ratio is much smaller than the above range, mechanical properties of a POF may be degraded, while when the circumferential velocity ratio is much larger than the above range, it becomes difficult to have a tension applied to the POF of $0.35 \times 10^6$ to $1.5 \times 10^6$ Pa.

Further, in the present invention, the annealing can be carried out by use of a heating furnace into which a POF is introduced horizontally. However, when the annealing is carried out under a tension of $0.35 \times 10^6$ to $1.5 \times 10^6$ Pa, the POF may hang down in the furnace by its own weight and make contact with the heating furnace in some cases. To prevent this, a POF to be heat-treated is introduced into an annealing zone substantially vertically to a horizontal plane and heat-treated. To carry out the annealing in this manner, an annealing device may be disposed perpendicularly to the ground, for example.

Further, when a POF is heat-treated under a tension of $0.35 \times 10^6$ to $1.5 \times 10^6$ Pa by use of a heating furnace disposed substantially horizontally, the annealing can be carried out with the POF to be heat-treated supported by a heating medium which provides buoyancy to the POF to prevent the POF from making contact with the heating furnace. For example, a POF is heat-treated with the POF supported by a heating medium such as hot air or pressurized steam blown out of pores of a porous plate such as a porous metal plate, porous heat-resistant plastic or porous sintered metal plate disposed in a heating furnace. In that case, to prevent the POF to be heat-treated from swaying, a wedge-shaped or concave path for passing the POF may be formed on the porous plate so that the heating medium can also be blown out from the path. The shape of the pores of the porous plate may be circular or rectangular but is not limited to these. When the pore is circular, its diameter is set as appropriate according to the annealing conditions and the size of a POF but is preferably 0.1 to 3 mm. When the diameters of the pores are too small, effects of the annealing and supporting a POF by a heating medium may be insufficient, while when the diameters of the pores are too large, the flow rate of a heating medium may be insufficient, thereby making it difficult to support a POF.

A POF obtained by carrying out the annealing at temperatures ranging from $(Tgc-5)°$ C. to $(Tgc+80)°$ C. under a tension of $0.35 \times 10^6$ to $1.5 \times 10^6$ Pa can achieve a thermal shrinkage ratio after heated at 90° C. for 65 hours of not higher than 0.5%. It is desirable to set the above conditions as appropriate in order to obtain such a POF.

Further, in the present invention, measurement of tension is carried out near an outlet of a heating furnace. For example, in the case of the production device shown in FIG. 5, the measurement is carried out between the roller 16 and the heating furnace 18, that is, at the point represented by reference numeral 20; in the case of the production device shown in FIG. 6, the measurement is carried out between the roller 22 and the heating furnace 23, that is, at the point represented by reference numeral 25; and in the case of the production device shown in FIG. 7, the measurement is carried out between the guide 29 on the side of outlet and the heating furnace 28, that is, at the point represented by reference numeral 31. The constitutions of the devices are not limited to these.

The heat resistance of a POF obtained by the above-described production method (second, third or fourth invention) of a POF can be further improved by subjecting the POF to the annealing, preferably a batch-type fixed-length annealing, at temperatures not higher than $(Tgc+8)°$ C.

The annealing in this case can be carried out by a known method such as a hot air method, a vacuum heating method or a moist heating method can be used. An annealing temperature is set as appropriate according to a material of POF to be heat-treated and is preferably $(Tgc-30)°$ C. or higher, more preferably $(Tgc-25)°$ C. or higher, much more preferably $(Tgc-15)°$ C. or higher, also is preferably $(Tgc+8)°$ C. or lower, more preferably $(Tgc+5)°$ C. or lower, much more preferably $(Tgc+3)°$ C. or lower. Particularly, when a homopolymer of methyl methacrylate is used as a core, the annealing temperature is preferably 85° C. or higher, more preferably 90° C. or higher, much more preferably 100° C. or higher, also is preferably 123° C. or lower, more preferably 120° C. or lower, much more preferably 118° C. or lower. When the annealing is carried out at an excessively high temperature, e.g., at a temperature higher than a Tg by 10° C. or more, over several hours, mechanical strength imparted by drawing may be further degraded as the temperature and time of the annealing increase. On the other hand, when the annealing temperature is too low, an effect of improving heat resistance may become insufficient.

The annealing time is selected as appropriate. When an annealing temperature is low, it may take a very long time, e.g., two to three days, to obtain an effect of annealing. When the annealing temperature is close to a glass transition temperature, the effect is exhibited even after a half day.

The above-described POF (first invention) of the present invention and POFs produced by the above-described production methods (second, third and fourth inventions) of a POF of the present invention can be used as POF cables by forming a coating layer around these POFs. As a material constituting the coating layer, a nylon resin such as conventionally used Nylon 12, a polyvinyl chloride, a polychlorotrifluoroethylene copolymer, a polyethylene, a polyurethane, perprene or the like can be used.

In addition, the POF cable can be used as a plugged POF cable by attaching a plug on the tip of the POF cable. A known plug can be used as the plug and attached by a known method.

EXAMPLES

The present invention will be described in more detail with reference to examples hereinafter. Evaluation methods and production devices used in the examples are as follows. As for the horizontal and vertical axes shown in FIG. 1, temperature and stress increase in the directions of corresponding arrows.

<Thermomechanical Analysis (TMA)>

TMA-SS100 manufactured by Seiko Instruments Inc. was used as a measuring device. The temperature rising rate was set at 5° C./min. And a Shrinkage stress under a static load of $2.2 \times 10^5$ Pa was measured. A point of intersection of a horizontal tangent to a point where stress starts to be on the increase after the decrease and a tangent to a point where the inclination of stress becomes maximum after it has been on the increase was taken as shrinkage stress occurring temperature as shown in FIG. 1.

<Measurement of Glass Transition Temperature>

Figure 2:
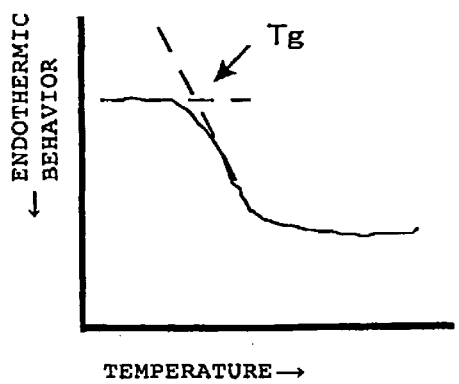
FIG. 2 is a diagram showing an example of a DSC curve in the vicinity of the Tg of a core.

DSC-220 manufactured by Seiko Instruments Inc. was used. A sample was heated to 200° C. at a temperature rising rate of 10° C./min and kept at the temperature for 10 minutes to be melted, and then quenched to 20° C. and heated at a temperature rising rate of 10° C./min again. From a DSC curve indicating exothermic and endothermic behaviors at that time, as shown in FIG. 2, a point of intersection of a straight line obtained by extending a base line at lower temperature side than a stepwise transition portion where glass transition occurs to higher temperature side and a tangent to a point of the DSC curve where the inclination of the stepwise transition portion of the DSC curve becomes maximum was taken as the glass transition temperature (refer to page 54 of "NEW BASICS AND APPLICATIONS OF THERMAL ANALYSIS" (1989), edited by Japan Thermal Measurement Institute, published by REALIZE CO., LTD., for example).

<Measurement of Birefringence>

A POF was immersed in a solvent such as dimethyl sulfoxide to remove a sheath layer and a protective layer so as to expose a core. The birefringence of the core was measured at room temperature by use of a polarizing microscope (polarizing microscope OPTIPHOTI-POL of Nikon Corporation) and a Senarmont compensator. When a vinylidene fluoride-tetrafluoroethylene copolymer is used in a sheath layer or a protective layer, the sheath layer and the protective layer can be removed with ease by immersing a POF in dimethyl sulfoxide at room temperature (20° C.) for about 10 seconds.

<Production Device 1>

Figure 3:
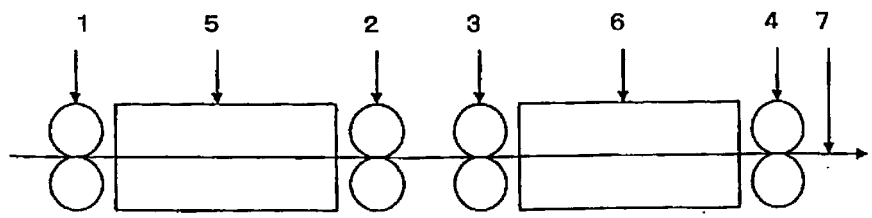
FIG. 3 is a schematic block diagram showing a production device 1 used in the present invention.

An example of a production device used in the present invention is shown in FIG. 3. In FIG. 3, reference numerals 1, 2, 3 and 4 denote nip rollers which have the function of delivering or withdrawing a POF denoted by reference numeral 7 at a fixed speed. Reference numerals 5 and 6 denote a heating furnace in which a POF is heated by use of hot air. A melt-spun undrawn POF is drawn at a given circumferential velocity ratio set by adjusting the circumferential velocities of rollers 1 and 2 and then heat treated between the rollers 3 and 4. Although this production device comprises a first drawing device and a second annealing device arranged in series, these devices may be arranged separately. Further, when the annealing is carried out twice or more, other annealing devices may be disposed after the annealing device. Reference numeral 20 denotes a point where tension is measured.

<Count of Number of Repeated Bending>

Figure 4:
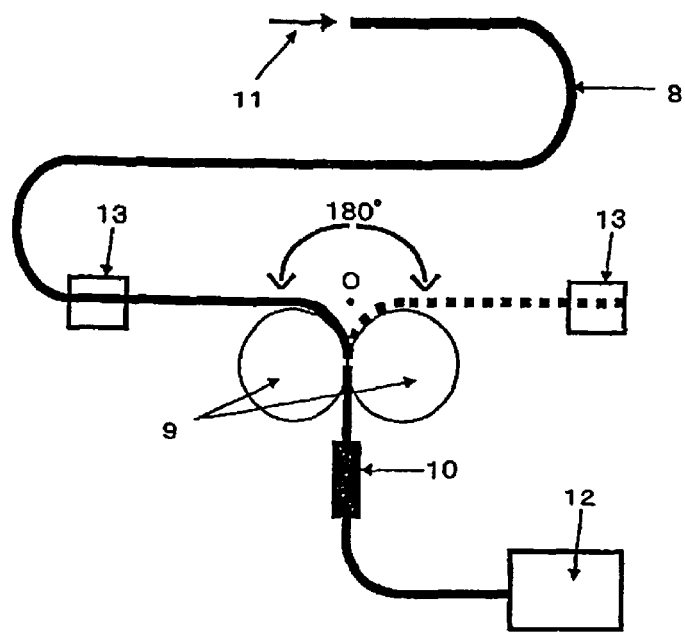
FIG. 4 is a schematic block diagram showing a repeated bending tester.

The number of repeated bending was counted by means of a repeated bending tester shown in FIG. 4. A POF cable 8 having a diameter of 2.2 mm is hung between two rollers 9 disposed with a spacing of 2.3 mm therebetween and each having a radius of 15 mm. A weight 10 having a weight of 0.5 kg is attached to one end of the POF cable 8, and the other end is held by holding hardware 13. The holding hardware 13 is attached to an arm which moves the holding hardware 13 along a virtual semicircle having the center at a point O shown in FIG. 4 and formed over the two rollers 9. The point O is a point located at a point of intersection of a straight line connecting the tops of the two rollers to each other and the symmetry axis of the two rollers. To be more specific, the arm falls down to one of the rollers 9 from a vertical direction to a horizontal direction at the center O, returns to the vertical direction, falls down to the other roller 9, and returns to the vertical direction again. The arm repeated this reciprocating action. The reciprocating action is counted as one action. The POF cable is repeatedly bent 30 times per minute. A light source is disposed at one end of the POF cable 8, and a photodetector is disposed at the other end. An LED 11 having a wavelength of 660 nm is used as the light source, and an optical power meter 12 is used as the photodetector. The POF cable 8 is disposed such that the distance from the optical power meter 12 to the roller 9 would be 1.5 m and the distance from the roller 9 to the LED 11 would be 3.5 m. The number of repeated bending in this test is the number of bendings of the POF cable when a quantity of light detected by the optical power meter is lowered from an initial value by 1 dB. In each example, an average of the results of five tests is shown as the number of repeated bending.

<Production Device 2>

Figure 5:
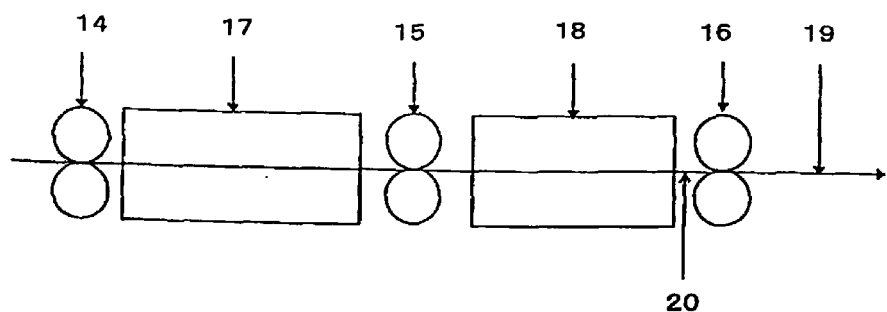
FIG. 5 is a schematic block diagram showing a production device 2 used in the present invention.

An example of a production device used in the present invention is shown in FIG. 5. In FIG. 5, reference numerals 14, 15 and 16 denote nip rollers which have the function of delivering or withdrawing a POF denoted by reference numeral 19 at a fixed speed. Reference numerals 17 and 18 denote a heating furnace in which a POF is heated by use of hot air. A melt-spun undrawn POF is drawn at a given circumferential velocity ratio set by adjusting the circumferential velocities of rollers 14 and 15 and then heat treated between the rollers 15 and 16. Although this production device comprises a first drawing device and a second annealing device arranged in series, these devices may be arranged separately. Further, when the annealing is carried out twice or more, other annealing devices may be disposed after the annealing device.

<Production Device 3>

Figure 6:
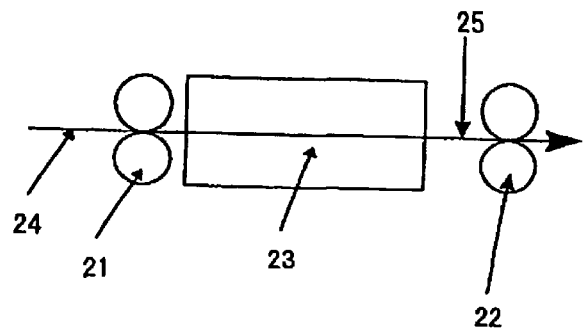
FIG. 6 is a schematic block diagram showing a production device 3 used in the present invention.

An example of a production device used in the present invention is shown in FIG. 6. In FIG. 6, reference numerals 21 and 22 denote nip rollers which have the function of delivering or withdrawing a POF denoted by reference numeral 24 at a fixed speed. Reference numeral 23 denotes a heating furnace in which a POF is heated by use of hot air. The present production device is constituted such that hot air is blown into the heating furnace from its center and the hot air blown into the heating furnace returns to a hot air generator from both sides of the heating furnace. The POF is drawn or heat treated by adjusting the circumferential velocities of the rollers 21 and 22. Reference numeral 25 denotes a point where tension is measured.

<Production Device 4>

Figure 7:
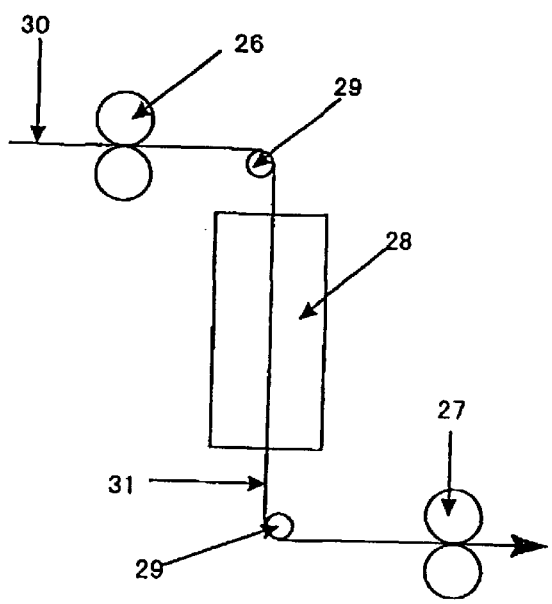
FIG. 7 is a schematic block diagram showing a production device 4 used in the present invention.

An example of a vertically disposed production device used in the present invention is shown in FIG. 7. In FIG. 7, reference numerals 26 and 27 denote nip rollers which have the function of delivering or withdrawing a POF denoted by reference numeral 30 at a fixed speed. Reference numeral 28 denotes a heating furnace in which a POF is heated by use of hot air. The present production device is constituted such that hot air is blown into the heating furnace from its bottom (POF outlet) and the hot air blown into the heating furnace returns to a hot air generator from the top (POF inlet) of the heating furnace. Reference numeral 29 denotes a guide. The POF is heat treated by adjusting the circumferential velocities of the rollers 26 and 27. Reference numeral 31 denotes a point where tension is measured.

<Measurement of Tension>

Tension at the time of the annealing was measured by use of a DTMB-2.5B tension meter manufactured by NIDEC-SHIMPO corporation at the point denoted by the reference numeral 20 between the roller 16 and the heating furnace 18 in the case of the production device 2, at the point denoted by the reference numeral 25 between the roller 22 and the heating furnace 23 in the case of the production device 3, and at the point denoted by the reference numeral 31 between the guide 29 and the heating furnace 28 in the case of the production device 4.

Comparative Example 1

Polymethylmethacrylate obtained by continuous bulk polymerization was used as a core. The Tg of the core was 112° C. (DSC method, temperature rising rate: 10° C./min). A copolymer of vinylidene fluoride/tetrafluoroethylene= 80/20 (mol %) was used as a sheath.

An undrawn POF comprising a core and a sheath was prepared from these polymers by means of a melt spinning method. The obtained undrawn POF was drawn at a roller circumferential velocity ratio (circumferential velocity of the roller 2/circumferential velocity of the roller 1) of 2.0 by means of the drawing device (first device shown in FIG. 3) comprising the non-contact heating furnace 5 set at 150° C. and having a furnace length of 3 m and the rollers 1 and 2 so as to obtain a POF having a fiber diameter of 750 μm and a core-sheath structure.

This POF was subjected to TMA measurement to determine shrinkage stress occurring temperature. The thermal shrinkage ratio and shrinkage stress occurring temperature of the obtained POF are shown in Table 1.

Examples 1 to 7 and Comparative Examples 2 to 5

After a POF drawn by means of the first drawing device shown in FIG. 3 in the same manner as in Comparative Example 1 was wound around a bobbin, the POF was heat treated at a roller circumferential velocity ratio (circumferential velocity of the roller 4/circumferential velocity of the roller 3) of 1.0 and at a temperature shown in Table 1 for a duration shown in Table 1 by means of the annealing device (second device shown in FIG. 3) comprising the non-contact heating furnace 6 having a furnace length of 3 m and the rollers 3 and 4 so as to obtain a POF having a fiber diameter of 750 μm and a core-sheath structure. The thermal shrinkage ratio and shrinkage stress occurring temperature of the obtained POF are shown in Table 1.

In Table 1, the symbol ○ is given to examples in which annealing conditions satisfy $4 \leq y \leq -1.5x+330$ and $(Tgc-5)° C. \leq x \leq (Tgc+5)° C.$ [Tgc: a glass transition temperature of a core, x: an annealing temperature (° C.), and y: an annealing time (seconds)], and the symbol X is given to examples in which the annealing conditions do not satisfy these equations.

POFs obtained by the method (second invention) of the present invention, that is, POFs which satisfy the above annealing conditions, have a shrinkage stress occurring temperature of at least $(Tgc-35)° C.$, that is, at least 77° C., and a thermal shrinkage ratio of not higher than 2% which is lower than those of the POFs of Comparative Examples. Therefore, they are excellent in heat resistance.

TABLE 1

| | Annealing Conditions | | Thermal | Shrinkage Stress | |
|---|---|---|---|---|---|
| | Temp. (° C.) | Time (sec) | Shrinkage Ratio (%) | Occurring Temp. (° C.) | Annealing Conditions |
| Comp. Ex. 1 | — | — | 2.4 | 73 | — |
| Comp. Ex. 2 | 145 | 3 | 2.1 | 76 | X |
| Example 1 | 145 | 6 | 2.0 | 79 | ○ |
| Example 2 | 145 | 10 | 1.7 | 80 | ○ |
| Example 3 | 145 | 15 | 1.2 | 84 | ○ |

TABLE 1-continued

| | Annealing Conditions | | Thermal | Shrinkage Stress | |
|---|---|---|---|---|---|
| | Temp. (° C.) | Time (sec) | Shrinkage Ratio (%) | Occurring Temp. (° C.) | Annealing Conditions |
| Example 4 | 145 | 30 | 1.0 | 85 | ○ |
| Comp. Ex. 3 | 165 | 3 | 2.2 | 76 | X |
| Example 5 | 165 | 6 | 1.9 | 77 | ○ |
| Example 6 | 165 | 9 | 1.5 | 80 | ○ |
| Comp. Ex. 4 | 185 | 3 | 2.3 | 76 | X |
| Example 7 | 185 | 5 | 1.5 | 78 | ○ |
| Comp. Ex. 5 | 190 | 3 | 2.2 | 74 | X |

Comparative Example 6

A POF having a fiber diameter of 1,000 μm and a core-sheath structure was produced in the same manner as in Comparative Example 1 except that the roller circumferential velocity ratio (circumferential velocity of the roller 2/circumferential velocity of the roller 1) was set to be 3.0. The thermal shrinkage ratio of the obtained POF is shown in Table 2.

Examples 8 to 13

The POF obtained in Comparative Example 6 was heat treated at a temperature of the non-contact heating furnace 6 having a furnace length of 3 m of 165° C., a circumferential velocity ratio (circumferential velocity of the roller 4/circumferential velocity of the roller 3) of 1.0, and roller circumferential velocities which were adjusted such that an annealing time would be 10 seconds, and the POF was then wound around a bobbin (Example 8). Then, the POF obtained in Example 8 was heat treated under the same conditions as used in Example B (using only the second device shown in FIG. 3), and the resulting POF was wound around a bobbin (Example 9). Thus, annealing of the POF was repeated under the same conditions as used in Example 8 for the numbers of times shown in Table 2 to obtain POFs which undergone the annealing for a different number of times (Examples 10 to 13).

The thermal shrinkage ratios of the obtained POFs are shown in Table 2. As is obvious from Table 2, POFs having smaller thermal shrinkage ratios and excellent heat resistance could be obtained by repeating the annealing twice or more.

TABLE 2

| | Number of Repeated Annealing | Thermal Shrinkage Ratio (%) |
|---|---|---|
| Comp. Ex. 6 | — | 2.1 |
| Example 8 | 1 | 1.6 |
| Example 9 | 2 | 1.3 |
| Example 10 | 3 | 1.2 |
| Example 11 | 4 | 1.0 |
| Example 12 | 5 | 0.9 |
| Example 13 | 6 | 0.8 |

Examples 14, 15 and 16

The POF obtained in Example 8 was subjected batch-type fixed-length annealing at 90° C. for 20 hours by using a commercially available hot air dryer in a similar manner (Example 14). Similarly, the POFs obtained in Examples 10 and 13 were subjected the batch-type fixed-length annealing (Examples 15 and 16). The results are shown in Table 3. POFs having further smaller thermal shrinkage ratios and excellent heat resistance could be obtained by the batch-type fixed-length annealing.

TABLE 3

| | Thermal Shrinkage Ratio (%) | Remarks |
|---|---|---|
| Example 14 | 0.5 | POF of Example 8 was subjected to the fixed-length annealing at 90° C. for 20 hours. |
| Example 15 | 0.4 | POF of Example 10 was subjected to the fixed-length annealing at 90° C. for 20 hours. |
| Example 16 | 0.3 | POF of Example 13 was subjected to the fixed-length annealing at 90° C. for 20 hours. |

As described above, POFs obtained by the method (second invention) of the present invention, that is, POFs which satisfy the above annealing conditions, have a shrinkage stress occurring temperature of at least (Tgc−35)° C., that is, at least 77° C., and a thermal shrinkage ratio of not higher than 2% which is lower than those of the POFs of Comparative Examples. Therefore, POFs having excellent heat resistance could be obtained. Further, it is understood that POFs having smaller thermal shrinkage ratios and excellent heat resistance could be obtained by carrying out the fixed-length annealing.

Examples 17 and 18

Polymethyl methacrylate obtained by continuous bulk polymerization was used as a core. The Tg of the core was 112° C. (DSC method, temperature rising rate: 10° C./min). A copolymer of 51 parts by weight of 2,2,2-trifluoromethyl methacrylate, 30 parts by weight of 1,1,2,2-tetrahydroperfluorodecyl methacrylate, 18 parts by weight of methyl methacrylate and 1 part by weight of methacrylic acid was used as a sheath. A copolymer of vinylidene fluoride/tetrafluoroethylene=80/20 (mol %) was used as a material for a protective layer.

An undrawn POF comprising a core, a sheath and a protective layer was prepared from these polymers by means of a melt spinning method. The obtained undrawn POF was drawn at a roller circumferential velocity ratio (circumferential velocity of the roller 2/circumferential velocity of the roller 1) of 2.7 by means of the drawing device (first device shown in FIG. 3) comprising the non-contact heating furnace 5 set at 160° C. and having a furnace length of 2.5 m and the rollers 1 and 2 so as to obtain a POF having a fiber diameter of 1,000 μm and a core-sheath-protective-layer structure.

After wound around a bobbin, the obtained POF was heat treated at annealing temperatures and roller circumferential velocity ratios (circumferential velocity of the roller 4/circumferential velocity of the roller 3) shown in Table 4 for annealing times shown in Table 4 by use of the second device shown in FIG. 3, i.e., the annealing device comprising the non-contact heating furnace 6 having a furnace length of 2.5 m and the rollers 3 and 4, to obtain POFs having a fiber diameter of 1,000 μm and a core-sheath-protective-layer structure. The shrinkage stress occurring temperatures, birefringence absolute values and thermal shrinkage ratios of the obtained POFs are shown in Table 4.

As is clear from Table 4, POFs having birefringence absolute values of not larger than $2.0 \times 10^{-4}$ and excellent heat resistance could be obtained.

TABLE 4

| | Annealing Conditions | | | | | | | |
|---|---|---|---|---|---|---|---|---|
| | Circumferential Velocity of Roller 3 (m/min) | Circumferential Velocity of Roller 4 (m/min) | Roller Circumferential Velocity Ratio | Temp. (° C.) | Annealing Time (sec) | Birefringence Absolute Value ($\times 10^{-4}$) | Thermal Shrinkage Ratio (%) | Shrinkage Stress Occurring Temp. (° C.) |
| Ex. 17 | 2.5 | 2.5 | 1.0 | 145 | 60 | 1.240 | 0.4 | 100 |
| Ex. 18 | 5 | 4.25 | 0.85 | 145 | 32 | 0.854 | 0.2 | 102 |

Comparative Example 7

A POF having a fiber diameter of 1,000 μm and a core-sheath structure was obtained in the same manner as in Comparative Example 1 except that the non-contact heating furnace was set to be 135° C. and the roller circumferential velocity ratio (circumferential velocity of the roller 2/circumferential velocity of the roller 1) was set to be 2.5 for drawing. The birefringence and thermal shrinkage ratio of the obtained POF are shown in Table 5.

Examples 19 to 21

A POF drawn in the same manner as in Comparative Example 7 by use of the first drawing device shown in FIG. 3 was heat treated at annealing temperatures and roller circumferential velocity ratios (circumferential velocity of the roller 4/circumferential velocity of the roller 3) shown in Table 5 for annealing times shown in Table 5 by use of the annealing device comprising the non-contact heating furnace 6 having a furnace length of 3 m and the rollers 3 and 4, to obtain POFs having a fiber diameter of 1,000 μm and a core-sheath structure. The shrinkage stress occurring temperatures, birefringence absolute values and thermal shrinkage ratios of the obtained POFs are shown in Table 5.

As is clear from Table 5, POFs having birefringence absolute values of not larger than $2.0 \times 10^{-4}$, small thermal shrinkage ratios and excellent heat resistance could be obtained.

Examples 22 and 23

After wound around a bobbin, a POF drawn in the same manner as in Comparative Example 7 was then heat treated at annealing temperatures and roller circumferential velocity ratios (circumferential velocity of the roller 4/circumferential velocity of the roller 3) shown in Table 5 for annealing times shown in Table 5 by use of the annealing device shown in FIG. 3 comprising the non-contact heating furnace 6 having a furnace length of 3 m and the rollers 3 and 4, to obtain POFs having a fiber diameter of 1,000 μm and a core-sheath structure. The shrinkage stress occurring temperatures, birefringence absolute values and thermal shrinkage ratios of the obtained POFs are shown in Table 5.

As is clear from Table 5, POFs having birefringence absolute values of not larger than $2.0 \times 10^{-4}$, small thermal shrinkage ratios and excellent heat resistance could be obtained.

TABLE 6

| | Annealing Conditions | | | | | |
|---|---|---|---|---|---|---|
| | Circumferential Velocity of Roller 3 (m/min) | Circumferential Velocity of Roller 4 (m/min) | Roller Circumferential Velocity Ratio | Temp. (° C.) | Annealing Time (sec) | Thermal Shrinkage Ratio (%) |
| Comp. Ex. 8 | — | — | — | — | — | 1.6 |
| Example 24 | 3.4 | 3.06 | 0.9 | 115 | 56 | 0.5 |
| Example 25 | 3.4 | 3.06 | 0.9 | 110 | 56 | 0.4 |

TABLE 5

| | Annealing Conditions | | | | | Birefringence Absolute Value (×10⁻⁴) | Thermal Shrinkage Ratio (%) | Shrinkage Stress Occurring Temp. (° C.) |
|---|---|---|---|---|---|---|---|---|
| | Circumferential Velocity of Roller 3 (m/min) | Circumferential Velocity of Roller 4 (m/min) | Roller Circumferential Velocity Ratio | Temp. (° C.) | Annealing Time (sec) | | | |
| Comp. Ex. 7 | — | — | — | — | — | 4.952 | 1.4 | — |
| Example 19 | 6.8 | 6.8 | 1.0 | 160 | 26 | 1.360 | 0.34 | 99 |
| Example 20 | 6.8 | 6.46 | 0.95 | 160 | 27 | 1.256 | 0.26 | 99 |
| Example 21 | 6.8 | 6.12 | 0.9 | 160 | 28 | 1.139 | 0.24 | 101 |
| Example 22 | 16 | 14.4 | 0.9 | 170 | 12 | 1.864 | 0.622 | 93 |
| Example 23 | 20 | 18 | 0.9 | 180 | 10 | 1.850 | 0.58 | 94 |

Comparative Example 8

A POF having a fiber diameter of 1,000 μm and a core-sheath structure was obtained in the same manner as in Comparative Example 1 except that the non-contact heating furnace 5 was set to be 135° C. and the roller circumferential velocity ratio (circumferential velocity of the roller 2/circumferential velocity of the roller 1) was set to be 2.7 for drawing. The thermal shrinkage ratio of the obtained POF is shown in Table 6.

Examples 24 to 25

After wound around a bobbin, a POF drawn in the same manner as in Comparative Example 8 by means of the first drawing device shown in FIG. 3 was heat treated at annealing temperatures and roller circumferential velocity ratios (circumferential velocity of the roller 4/circumferential velocity of the roller 3) shown in Table 6 for annealing times shown in Table 6 by means of the annealing device comprising the non-contact heating furnace 6 having a furnace length of 3 m and the rollers 3 and 4. The thermal shrinkage ratios of the obtained POFs are shown in Table 6.

Examples 26 to 28

The same polymers as those used in Example 17 were used in a core, a sheath and a protective layer, and an undrawn POF having a core-sheath-protective-layer structure was prepared by a melt spinning method.

The obtained undrawn POF was drawn by means of the production device 1 shown in FIG. 3 at a temperature of the first non-contact heating furnace 5 of 135° C. and a roller circumferential velocity ratio (circumferential velocity of the roller 2/circumferential velocity of the roller 1) of 2.7 so as to obtain a POF having a birefringence absolute value of $5.912 \times 10^{-4}$ This POF was continuously fed into the non-contact heating furnace 6 of the second annealing device of the production device 1 of FIG. 3 and heat treated at a temperature of the non-contact heating furnace 6 having a furnace length of 3 m of 130° C., a roller circumferential velocity ratio (circumferential velocity of the roller 4/circumferential velocity of the roller 3) of 0.7 and a circumferential velocity of the roller 3 of 3.5 m/min to obtain a POF having a core-sheath-protective-layer structure (Example 26).

Further, a POF was drawn under the same conditions as those used in Example 26 by means of the first drawing device of the production device 1 shown in FIG. 3, and the drawn POF was wound around a bobbin. This POF was heat treated by means of the second annealing device of the production device 1 shown in FIG. 3 at a temperature of the non-contact heating furnace 6 having a furnace length of 3 m of 125° C., a roller circumferential velocity ratio (circumferential velocity of the roller 4/circumferential velocity of the roller 3) of 0.7 and a circumferential velocity of the roller 3 of 3.5 m/min to obtain a POF having a core-sheath-protective-layer structure (Example 27).

Further, a POF was drawn under heating by means of the production device 1 shown in FIG. 3 at a temperature of the first non-contact heating furnace 5 of 140° C. and a roller circumferential velocity ratio of 3.3 and then wound around a bobbin. A POF having a birefringence absolute value of $5.833 \times 10^{-4}$ was obtained. The obtained POF was heat treated at an annealing temperature of the non-contact heating furnace 6 having a furnace length of 3 m in the second annealing device shown in FIG. 3 of 115° C., a roller circumferential velocity ratio (circumferential velocity of the roller 4/circumferential velocity of the roller 3) of 0.9 and a circumferential velocity of the roller 3 of 3.5 m/min to obtain a core-sheath-protective-layer structure Example 28

TMA and measurements of birefringences and thermal shrinkage ratios were conducted on these POFs, and a molten polyethylene was continuously applied to the peripheries of these POFs by use of a cable production device to produce POF cables, and the numbers of repeated bending of these POF cables were counted. The results are shown in Table 7. These POFs were excellent in mechanical properties and heat shrinkability because they had birefringence absolute values of not smaller than $1.5 \times 10^{-4}$ and shrinkage stress occurring temperatures of not lower than $(Tg-20)°$ C.

TABLE 7

| | Shrinkage Stress Occurring Temp. (° C.) | Birefringence Absolute Value | Thermal Shrinkage Ratio (%) | Number of Repeated Bending (times) |
|---|---|---|---|---|
| Example 26 | 98 | $2.157 \times 10^{-4}$ | 0.46 | 12350 |
| Example 27 | 100 | $1.880 \times 10^{-4}$ | 0.37 | 10240 |
| Example 28 | 99 | $3.270 \times 10^{-4}$ | 0.47 | 18310 |

Examples 29 to 30

The same polymers as those used in Example 17 were used in a core, a sheath and a protective layer, and an undrawn POF having a core-sheath-protective-layer structure was prepared by a melt spinning method.

The obtained undrawn POF was drawn under heating by means of the production device 2 shown in FIG. 5 at a temperature of the first non-contact heating furnace 17 of 140° C. and a roller circumferential velocity ratio (circumferential velocity of the roller 15/circumferential velocity of the roller 14) of 2.7 to obtain a POF having a birefringence absolute value of $4.36 \times 10^{-4}$. Except that this POF was continuously fed into the second annealing device shown in FIG. 5 and heat treated at a temperature of the non-contact heating furnace 18 having a furnace length of 2 m of 130° C., a hot air velocity of 7 m/sec, a roller circumferential velocity ratio (circumferential velocity of the roller 16/circumferential velocity of the roller 15) of 0.83 and a circumferential velocity of the roller 15 of 6.8 m/min, a POF having a core-sheath-protective-layer structure was obtained in the same manner as in Example 17 (Example 29).

Further, except that a POF drawn in the same manner as in Example 29 by use of the first production device shown in FIG. 5 was wound around a bobbin and then drew under heating by means of the second annealing device shown in FIG. 5 comprising the non-contact heating furnace 18 having a furnace length of 2.5 m and the rollers 15 and 19 at an annealing temperature of 115° C., a hot air velocity of 7 m/sec, a roller circumferential velocity ratio (circumferential velocity of the roller 16/circumferential velocity of the roller 15) of 0.95 and a circumferential velocity of the roller 15 of 2.0 m/min, a POF having a core-sheath-protective-layer structure was obtained in the same manner as in Example 17 (Example 30).

TMA and measurements of birefringences and thermal shrinkage ratios were conducted on these POFS, and molten Nylon 12 was continuously applied to the peripheries of these POFs to form two layers of Nylon 12 on the POFs by use of a cable production device so as to produce POF cables, and the numbers of repeated bending of these POF cables were counted. The results of these measurements and tensions at the time of annealing are shown in Table 8. These POFs were excellent in mechanical properties and heat shrinkability because they had birefringence absolute values of not smaller than $1.5 \times 10^{-4}$ and shrinkage stress occurring temperatures of not lower than $(Tg-20)°$ C.

TABLE 8

| | Tension (Pa) | Shrinkage Stress Occurring Temp. (° C.) | Birefringence Absolute Value | Thermal Shrinkage Ratio (%) | Number of Repeated Bending (times) |
|---|---|---|---|---|---|
| Example 29 | $1.47 \times 10^6$ | 99 | $2.03 \times 10^{-4}$ | 0.45 | 27150 |
| Example 30 | $1.31 \times 10^6$ | 99 | $2.78 \times 10^{-4}$ | 0.41 | 49320 |

Comparative Example 9

The same polymers as those used in Comparative Example 1 were used in a core and a sheath.

These polymers were fed into a multi-component fiber spinning nozzle heated at 230° C., and an undrawn POF was prepared by a melt spinning method. The obtained undrawn POF was drawn by use of a drawing device comprising the rollers 21 and 22 and non-contact heating furnace 23 shown in FIG. 6. The drawing was carried out at a furnace length of the non-contact heating furnace of 3 m, a hot air velocity of 6 m/sec, a hot air temperature (annealing temperature) of 135° C. and a roller circumferential velocity ratio (circumferential velocity of the roller 22/circumferential velocity of the roller 21) of 2.7. A POF having a diameter of 1,000 μm and a core-sheath structure was obtained. The Tg of the core of the POF was 112° C. (DSC method, temperature rising rate: 10° C./min). The thermal shrinkage ratio of the obtained POF is shown in Table 9.

Comparative Example 10

A PoF having a diameter of 1,000 μm and a core-sheath structure was obtained in the same manner as in Comparative Example 9 except that the velocity of hot air at the time of drawing was changed to 9 m/sec. The thermal shrinkage ratio of the obtained POF is shown in Table 9.

Example 31

After wound around a bobbin, the POF obtained in Comparative Example 9 was then heat treated by use of the production device 4 shown in FIG. 7 which had a furnace length of 2 m. The annealing was conducted at a hot air velocity of 6 m/sec, a circumferential velocity of the roller 26 of 3.4 m/min, and a heating furnace temperature and roller circumferential velocity ratio (circumferential velocity of the roller 27/circumferential velocity of the roller 26) shown in Table 9. Tensions at the time of the annealing, thermal shrinkage ratios, shrinkage stress occurring temperatures and birefringence absolute values before and after the annealing of the obtained POF are shown in Tables 9 and 10.

Example 32

After wound around a bobbin, the POF obtained in Comparative Example 10 was then heat treated by use of the production device 3 shown in FIG. 6 which had a furnace length of 3 m. The annealing was conducted at a velocity of hot air from the hot air generator of 9 m/sec, a circumferential velocity of the roller 21 of 3.4 m/min, and a heating furnace temperature and roller circumferential velocity ratio (circumferential velocity of the roller 22/circumferential velocity of the roller 21) shown in Table 9. Tensions at the time of the annealing, thermal shrinkage ratios, shrinkage stress occurring temperatures and birefringence absolute values before and after the annealing of the obtained POF are shown in Tables 9 and 10.

Comparative Example 11

Polymethyl methacrylate obtained by continuous bulk polymerization was used as a core. A copolymer of 51 parts by weight of 2,2,2-trifluoromethyl methacrylate, 30 parts by weight of 1,1,2,2-tetrahydroperfluorodecyl methacrylate, 18 parts by weight of methyl methacrylate and 1 part by weight of methacrylic acid was used as a sheath. A copolymer of vinylidene fluoride/tetrafluoroethylene 80/20 (mol %) was used as a material for a protective layer.

These polymers were fed into a multi-component fiber spinning nozzle heated at 230° C., and an undrawn POF was prepared by a melt spinning method. The obtained undrawn POF was drawn by use of the production device 3 comprising the rollers 21 and 22 and non-contact heating furnace 3 shown in FIG. 6. The drawing was carried out at a furnace length of the non-contact heating furnace of 2.5 m, a hot air velocity of 6 m/sec, a hot air temperature (annealing temperature) of 140° C. and a roller circumferential velocity ratio (circumferential velocity of the roller 22/circumferential velocity of the roller 21) of 2.7. A POF having a diameter of 1,000 μm and a core-sheath-protective-layer structure was obtained. The Tg of the core of the POF was 112° C. (DSC method, temperature rising rate: 10° C./min). The thermal shrinkage ratio of the obtained POF is shown in Table 9.

Example 33

Figure 8:
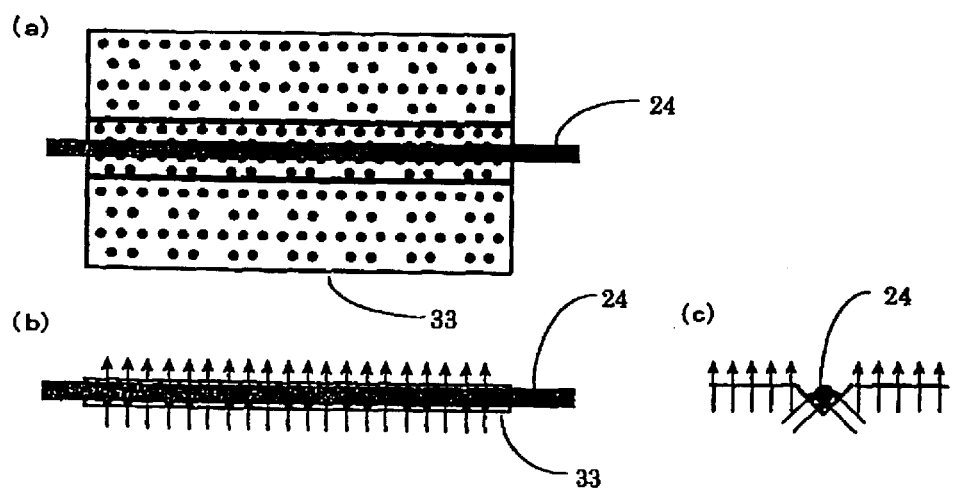
FIG. 8 is a schematic block diagram showing a perforated plate in a production device used in the present invention.
Figure 9:
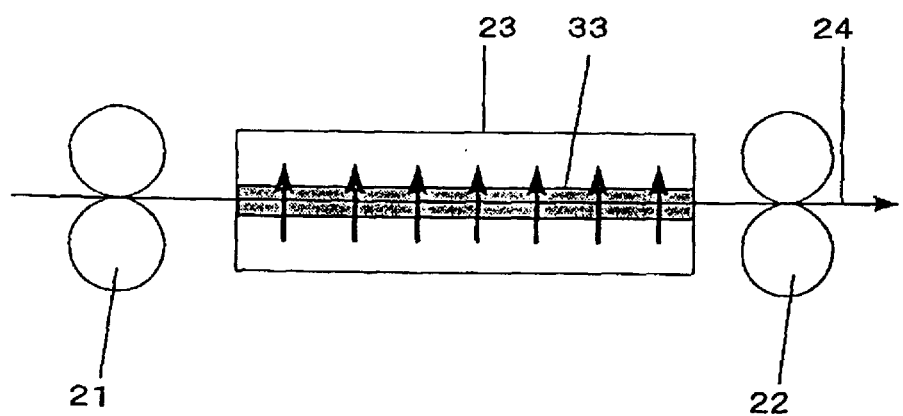
FIG. 9 is a schematic block diagram showing a production device used in the present invention which has a perforated plate disposed therein.

As shown in FIG. 8, a stainless steel porous plate 33 having a plurality of pores each having a diameter of 0.5 mm all over its surface and a wedge-shaped path for passing a POF on the surface was disposed in the production device 3 having a furnace length of 2 m shown in FIG. 6 in the manner shown in FIG. 9 to prepare an annealing device. Arrows in FIGS. 8 and 9 indicate directions of hot air. Further, FIG. 8(a) is a plan view of the porous plate 33 with a POF 24 placed in the wedge-shaped path, FIG. 8(b) is a cross sectional view of the POF of FIG. 8(a) in the longitudinal direction, and FIG. 8(c) is a cross sectional view of the POF of FIG. 8(a) in a direction perpendicular to the longitudinal direction. Using this annealing device, the POF of Comparative Example 11 which had been wound around a bobbin was heat treated at a velocity of hot air from the hot air generator of 6 m/sec, a circumferential velocity of the roller 21 of 2 m/min, and a hot air temperature and roller circumferential velocity ratio (circumferential velocity of the roller 22/circumferential velocity of the roller 21) shown in Table 9. Tensions at the time of the annealing, thermal shrinkage ratios, shrinkage stress occurring temperatures and birefringence absolute values before and after the annealing of the obtained POF are shown in Tables 9 and 10.

TABLE 9

| | Annealing Conditions | | Tension at | Thermal |
| | Temp. (° C.) | Circumferential Velocity Ratio | Annealing (Pa) | Shrinkage Ratio (%) |
|---|---|---|---|---|
| Comp. Ex. 9 | — | — | — | 2.2 |
| Comp. Ex. 10 | — | — | — | 1.6 |
| Example 31 | 115 | 0.9 | $0.43 \times 10^6$ | 0.4 |
| Example 32 | 110 | 0.9 | $1.2 \times 10^6$ | 0.4 |
| Comp. Ex. 11 | — | — | — | 1.3 |
| Example 33 | 115 | 0.93 | $0.81 \times 10^6$ | 0.3 |

TABLE 10

| | Birefringence Absolute Value | | Shrinkage Stress |
| | before Annealing | after Annealing | Occurring Temp. (° C.) |
|---|---|---|---|
| Example 31 | $5.88 \times 10^{-4}$ | $2.31 \times 10^{-4}$ | 99 |
| Example 32 | $4.33 \times 10^{-4}$ | $2.45 \times 10^{-4}$ | 99 |
| Example 33 | $4.35 \times 10^{-4}$ | $2.33 \times 10^{-4}$ | 101 |

What is claimed is:

1. A production method of a plastic optical fiber, comprising the step of, at least once, annealing a plastic optical fiber obtained by heat-drawing an undrawn fiber obtained by melt spinning, at a circumferential velocity ratio between the front and rear rollers (circumferential velocity of a rear roller/circumferential velocity of a front roller) of 0.5 to 1.2 under heating conditions which satisfy $4 \leq y \leq -1.5x+330$ and $(Tgc-5)° C. \leq x \leq (Tgc+110)° C.$ wherein Tgc represents a glass transition temperature of a core, x represents an annealing temperature (° C.), and y represents an annealing time (seconds).

2. The production method as claimed in claim 1, wherein a homopolymer of methyl methacrylate, or a copolymer comprising a methyl methacrylate unit and another monomer unit is used as the core.

3. The production method as claimed in claim 1, wherein the core of the plastic optical fiber comprises a homopolymer of methyl methacrylate, the heat drawing is carried out such that the birefringence absolute value of the core becomes $3 \times 10^{-4}$ or higher, and the annealing is carried out at a circumferential velocity ratio between the front and rear rollers (circumferential velocity of the rear roller/circumferential velocity of the front roller) of not higher than 1 under conditions which satisfy $x \leq (Tgc+20)° C.$, wherein Tgc represents the glass transition temperature of the core, and x represents an annealing temperature (° C.).

4. The production method as claimed in claim 1, which has the step of carrying out annealing under the heating conditions twice or more.

5. A production method of a plastic optical fiber, comprising the step of fixed length annealing a plastic optical fiber obtained by the method as claimed in claim 1 at a temperature not higher than (a glass transition temperature of a core+8°)C.

6. A plastic optical fiber obtained by the method as claimed in any one of claims 1 to 5 and having a shrinkage stress occurring temperature obtained by thermomechanical analysis of not lower than (a glass transition temperature of a core−35)° C.

7. The plastic optical fiber as claimed in claim 6, wherein the core comprises a homopolymer of methyl methacrylate and has a birefringence absolute value of not larger than $2.0 \times 10^{-4}$.

8. A plastic optical fiber obtained by the method as claimed in any one of claims 1 to 5, having a core which comprises a homopolymer of methyl methacrylate and has a birefringence absolute value of not smaller than $1.5 \times 10^{-4}$, and having a shrinkage stress occurring temperature obtained by thermomechanical analysis of not lower than (a glass transition temperature of the core−20)° C.

9. The plastic optical fiber as claimed in claim 6, which exhibits a shrinkage ratio of not higher than 2% when heated at 90° C. for 65 hours.

10. A plastic optical fiber cable obtained by forming a coating layer around the plastic optical fiber as claimed in claim 6.

11. A plugged plastic optical fiber cable obtained by attaching a plug on the tip of the plastic optical fiber cable as claimed in claim 10.

12. The production method as claimed in claim 1, wherein the annealing step and the heat-drawing step are carried out continuously.

13. The production method of a plastic optical fiber, comprising the step of fixed-length annealing a plastic optical fiber obtained by the method as claimed in claim 3 at a temperature not higher than (a glass transition temperature of a core+8)° C.

14. The plastic optical fiber as claimed in claim 8, which exhibits a shrinkage ratio of not higher than 2% when heated at 90° C. for 65 hours.

15. A plastic optical fiber cable obtained by forming a coating layer around the plastic optical fiber as claimed in claim 8.

16. The production method as claimed in claim 1, wherein the annealing is carried out while a tension of $0.35 \times 10^6$ to $1.5 \times 10^6$ Pa is applied to the fiber.

17. The production method as claimed in claim 16, wherein the annealing is carried out by introducing a plastic optical fiber into an annealing zone substantially vertically to a horizontal plane.

18. The production method as claimed in claim 16, wherein the annealing is carried out by use of a heating furnace disposed substantially horizontally with a plastic optical fiber to be annealed supported by a heating medium which provides buoyancy to the plastic optical fiber so as to cause the plastic optical fiber to travel within an annealing zone in a non-contact manner.

19. The production method as claimed in claim 16, wherein the annealing is carried out by alleviation treatment.

20. The production method as claimed in claim 16, wherein the annealing is hot air annealing.

21. The production method as claimed in claim 16, wherein the annealing is carried out such that a produced plastic optical fiber exhibits a shrinkage ratio when heated at 90° C. for 65 hours of not higher than 0.5%.

22. A production method of a plastic optical fiber cable, comprising the steps of obtaining a plastic optical fiber by the method as claimed in claim 1, and then forming a coating layer around the obtained optical fiber.

23. A production method of a plugged plastic optical fiber cable, comprising the steps of obtaining a plastic optical fiber cable by the method of claimed in claim 22, and then attaching a plug on the tip of the obtained optical fiber cable.

24. A production method of a plastic optical fiber, comprising the step of annealing a plastic optical fiber obtained by melt spinning, at a temperature from (a glass transition temperature of a core−5)° C. to (the glass transition temperature of the core+80)° C. while a tension of $0.35 \times 10^6$ to $1.5 \times 10^6$ Pa is applied to the fiber.

25. The production method as claimed in claim 24, which has the step of heat-drawing a plastic optical fiber and carrying out the annealing after heat-drawing the plastic optical fiber.

26. The production method as claimed in claim 24 or 25, wherein a polymer containing a methyl methacrylate unit in an amount of not smaller than 70% by weight is used as the core of a plastic optical fiber.

27. The production method as claimed in claim 24 or 25, wherein a homopolymer of methyl methacrylate is used as the core of a plastic optical fiber and the annealing is carried out at a temperature not higher than (a glass transition temperature of the core+30)° C. such that the core has a birefringence absolute value of not smaller than $1.5 \times 10^{-4}$ and the plastic optical fiber has a shrinkage stress occurring temperature obtained by thermomechanical analysis of not lower than (the glass transition temperature of the core−20)° C.

28. The production method as claimed in claim 24 or 25, wherein the annealing is carried out by introducing a plastic optical fiber into an annealing zone substantially vertically to a horizontal plane.

29. The production method as claimed in claim 24 or 25, wherein the annealing is carried out by use of a heating furnace disposed substantially horizontally with a plastic optical fiber to be annealed supported by a heating medium which provides buoyancy to the plastic optical fiber so as to cause the plastic optical fiber to travel within an annealing zone in a non-contact manner.

30. The production method as claimed claim 24 or 25, wherein the annealing is carried out by alleviation treatment.

31. The production method as claimed in claim 24 or 25, wherein the annealing is hot air annealing.

32. The production method as claimed claim 24 or 25, wherein the annealing is carried out such that a produced plastic optical fiber exhibits a shrinkage ratio when heated at 90° C. for 65 hours of not higher than 0.5%.

33. A production method of a plastic optical fiber cable, comprising the steps of obtaining a plastic optical fiber by the method as claimed in claim 24 or 25, and then forming a coating layer around the obtained optical fiber.

34. A production method of a plugged plastic optical fiber cable, comprising the steps of obtaining a plastic optical fiber cable by the method as claimed in claim 33, and then attaching a plug on the tip of the obtained optical fiber cable.

* * * * *